US010711661B2

United States Patent
Nau et al.

(10) Patent No.: US 10,711,661 B2
(45) Date of Patent: Jul. 14, 2020

(54) METHOD AND DEVICE FOR OPERATING A DRIVE UNIT, DRIVE UNIT, MOTOR VEHICLE

(71) Applicant: Robert Bosch GmbH, Stuttgart (DE)

(72) Inventors: Michael Nau, Dornhan/Aischfeld (DE); Michael Bauerle, Eberdingen (DE)

(73) Assignee: Robert Bosh GmbH, Stuttgart (DE)

( * ) Notice: Subject to any disclaimer, the term of this patent is extended or adjusted under 35 U.S.C. 154(b) by 0 days.

(21) Appl. No.: 15/574,762

(22) PCT Filed: May 13, 2016

(86) PCT No.: PCT/EP2016/060846
§ 371 (c)(1),
(2) Date: Nov. 16, 2017

(87) PCT Pub. No.: WO2017/001107
PCT Pub. Date: Jan. 5, 2017

(65) Prior Publication Data
US 2018/0149047 A1    May 31, 2018

(30) Foreign Application Priority Data
Jun. 29, 2015  (DE) .......................... 10 2015 212 070

(51) Int. Cl.
*F01L 1/38*     (2006.01)
*F02B 37/10*    (2006.01)
(Continued)

(52) U.S. Cl.
CPC ............... *F01L 1/38* (2013.01); *F02B 37/10* (2013.01); *F02B 39/10* (2013.01); *F02B 69/06* (2013.01);
(Continued)

(58) Field of Classification Search
CPC ...... F01L 1/053; F01L 1/38; F01L 2001/0537; F01L 2013/0052; F01L 2013/101;
(Continued)

(56) References Cited

U.S. PATENT DOCUMENTS

2007/0234984 A1 * 10/2007 Kolmanovsky ........... F01L 9/04
                                                         123/90.15
2010/0300383 A1   12/2010 Pursifull et al.
(Continued)

FOREIGN PATENT DOCUMENTS

CN      101571075 A    11/2009
EP         433039 A1    6/1991
(Continued)

OTHER PUBLICATIONS

International Search Report dated Aug. 8, 2016, of the corresponding International Application PCT/EP2016/060846 filed May 13, 2016.

*Primary Examiner* — Lindsay M Low
*Assistant Examiner* — Ruben Picon-Feliciano
(74) *Attorney, Agent, or Firm* — Norton Rose Fulbright US LLP; Gerard Messina

(57) ABSTRACT

A method for operating a drive apparatus, having a reciprocating-piston engine and an exhaust-gas-driven turbocharger, of a motor vehicle, the reciprocating-piston engine being operated in a four-stroke mode during on-load operation; and the exhaust-gas-driven turbocharger having an electrical machine, in particular a media gap machine, that is operated in generator mode during overrun operation of the reciprocating-piston engine. During overrun operation, the reciprocating-piston engine is operated in a two-stroke mode.

8 Claims, 3 Drawing Sheets

(51) Int. Cl.
   *F02B 39/10*   (2006.01)
   *F02B 69/06*   (2006.01)
   *F02B 75/02*   (2006.01)
   *F01L 1/053*   (2006.01)
   *F01L 13/00*   (2006.01)

(52) U.S. Cl.
   CPC ....... *F01L 1/053* (2013.01); *F01L 2001/0537* (2013.01); *F01L 2013/0052* (2013.01); *F01L 2013/101* (2013.01); *F02B 2075/025* (2013.01); *F02B 2075/027* (2013.01); *Y02T 10/144* (2013.01)

(58) Field of Classification Search
   CPC .......... F02B 2075/025; F02B 2075/027; F02B 37/10; F02B 39/10; F02B 69/06; Y02T 10/144
   See application file for complete search history.

(56) References Cited

U.S. PATENT DOCUMENTS

| | | | |
|---|---|---|---|
| 2011/0022289 A1 | 1/2011 | Hofbauer | |
| 2012/0240887 A1* | 9/2012 | Cook | F01L 1/40 123/90.15 |

FOREIGN PATENT DOCUMENTS

| | | |
|---|---|---|
| JP | S58152139 A | 9/1983 |
| JP | H04314927 A | 11/1992 |

* cited by examiner

METHOD AND DEVICE FOR OPERATING A DRIVE UNIT, DRIVE UNIT, MOTOR VEHICLE

FIELD

The present invention relates to a method for operating a drive apparatus, having a reciprocating-piston engine and an exhaust-gas-driven turbocharger, of a motor vehicle, the reciprocating-piston engine being operated in a four-stroke mode at least during on-load operation; and the exhaust-gas-driven turbocharger having an electrical machine, in particular a media gap machine, that is operated in generator mode during overrun operation of the reciprocating-piston engine. The present invention further relates to an apparatus for operating a drive apparatus of this kind, and to a corresponding drive apparatus and to a motor vehicle.

BACKGROUND INFORMATION

Conventionally, exhaust-gas-driven turbochargers of drive apparatuses of motor vehicles may be electrically assisted so that, in particular, a delayed pressure buildup at low rotation speeds of the reciprocating-piston engine can be overcome. The exhaust-gas-driven turbocharger is driven at least at times by the electrical machine, so that the power output of the exhaust-gas-driven turbocharger is independent of the exhaust gas of the reciprocating-piston engine which is available for drive purposes. The use of so-called "media gap" machines has proven to be an advantageous solution for integrating an electrical machine into the exhaust-gas-driven turbocharger. A media gap machine is notable for a comparatively large air gap between stator and rotor which, when correctly utilized, is usable for guidance of a medium. In the context of utilization in an exhaust-gas-driven turbocharger, the media gap machine is integrated in such a way that it is located in an intake duct of the exhaust-gas-driven turbocharger, so that the air to be delivered flows through the aforementioned air gap. This enables particularly compact integration of the electric motor into the turbocharger.

As the electrification of motor vehicles progresses, the recovery of electrical energy also becomes increasingly important. Conventionally, the media gap machine may be operated in generator mode in order to recover energy, the drive force then being made available in generator mode, in particular, by the exhaust gas of the reciprocating-piston engine. This application has hitherto been sensible, however, only during normal operation or on-load operation of the reciprocating-piston engine, since only then is sufficient drive energy made available for the exhaust-gas-driven turbocharger by the exhaust gas of the reciprocating-piston engine.

SUMMARY

An example method according to the present invention may offer the advantage that the electrical machine is advantageously operable in generator mode during overrun operation as well, the method according to the present invention ensuring that the machine is driven with sufficient intensity that electrical energy is generated to a sufficient degree.

In one example embodiment, the method according to the present invention provides for this purpose that the reciprocating-piston engine is operated in a two-stroke mode during overrun operation of the reciprocating-piston engine. Provision is therefore made that upon a change from normal operation or on-load operation to overrun operation, a changeover is made from a four-stroke mode to a two-stroke mode, such that in the two-stroke mode the intake valve or valves associated with a piston are opened with each downward stroke (intake stroke) of that piston, and the exhaust valve or valves associated with that piston are opened upon each upward stroke (compression stroke). In particular, the exhaust valves are closed on the downward stroke and the intake valves are closed on the upward stroke. The consequence of this is that in overrun mode, a mass flow of gas is driven out of the individual cylinders with each piston stroke and is made available to drive the exhaust-gas-driven turbocharger. The mass flow of gas is thus doubled as compared with four-stroke overrun operation at the same intake manifold pressure. A considerably larger mass flow of gas, and higher enthalpy, are thus available during overrun operation, so that a turbine of the exhaust-gas-driven turbocharger can generate appropriate power output for generator-mode operation of the electrical machine.

According to a preferred refinement of the present invention, provision is made that a camshaft of the reciprocating-piston engine is operated with a four-stroke cam profile during on-load operation, and with a two-stroke cam profile during overrun operation. The different operating modes of the reciprocating-piston engine are thus furnished by way of cam profiles of the camshaft. A simple switchover between four-stroke mode and two-stroke mode is therefore effected by changing the cam profile.

Provision is made in particular that the camshaft is shifted axially in order to modify the cam profile. A simple switchover between different cam profiles can thereby occur. Adjustable camshafts having different cam profiles are known in principle. In the present case, the cam profiles are embodied for different operating modes of the reciprocating-piston engine, so that respectively for at least one intake valve and/or exhaust valve of at least one cylinder of the reciprocating-piston engine, a respective cam profile for four-stroke mode and a further cam profile for two-stroke mode are present.

According to a preferred refinement of the present invention, provision is made that the camshaft is shifted by way of a gated guide. For this the camshaft has on its outer enveloping side, in particular, a guidance groove into which a guidance pin is introducible. The guidance groove extends in particular in a curved guide, while the guidance pin is disposed in housing-mounted fashion and is shifted radially with respect to the camshaft so that when it engages into the guidance groove, the camshaft shifts axially.

Provision is furthermore preferably made that during overrun operation, a throttle valve of the reciprocating-piston engine is opened to maximum width. This ensures that the largest possible gas flow is delivered by the reciprocating-piston engine. This is usefully provided for when the reciprocating-piston engine is a gasoline engine.

Provision is furthermore preferably made that during overrun operation, a wastegate of the exhaust-gas-driven turbocharger is closed and/or a variable turbine geometry of the exhaust-gas-driven turbocharger is adjusted for maximum drive power output. The result of closing the wastegate or adjusting the turbine geometry is that the turbine of the exhaust-gas-driven turbocharger is impinged upon with the maximum possible drive energy, so that the electrical machine achieves a correspondingly high level of generator-mode power output.

Provision is furthermore preferably made that during overrun operation, the opening point in time of at least one exhaust valve is retarded. The result thereby achieved is that firstly a compression event occurs inside the cylinder and, upon opening of the exhaust valve, then furnishes additional enthalpy for the turbine in the form of a pulse charge.

An example apparatus according to the present invention may include a specially configured control device that carries out the method according to the present invention. Further features and advantages are evident from what has been described above. Provision is made in particular that the electrical machine is embodied as a media gap machine that is located in an intake duct of the exhaust-gas-driven turbocharger.

An example drive apparatus according to the present invention may include a reciprocating-piston engine that has at least one adjustable camshaft that is adjustable between a two-stroke cam profile and a four-stroke cam profile; and that the apparatus according to the present invention is present. As a result of the adjustment of the camshaft, the internal combustion engine is thus switched from a four-stroke mode into the previously described two-stroke mode, or vice versa. Further features and advantages are evident from what has been described above. Provision is made in particular that a camshaft of this kind is associated with both the intake valves and the exhaust valves, so that at least one pertinent intake valve is opened with each downward piston stroke, and at least one respectively associated exhaust valve is opened with each upward piston stroke. Mass throughput in two-stroke mode can thereby be doubled, at the same intake manifold pressure, as compared with a four-stroke mode.

An example motor vehicle according to the present invention may include a drive apparatus according to the present invention. The advantages already recited above result therefrom. Further features and advantages are evident from what is described above.

The present invention is explained in further detail below with reference to the figures.

DETAILED DESCRIPTION OF EXAMPLE EMBODIMENTS

Figure 1:
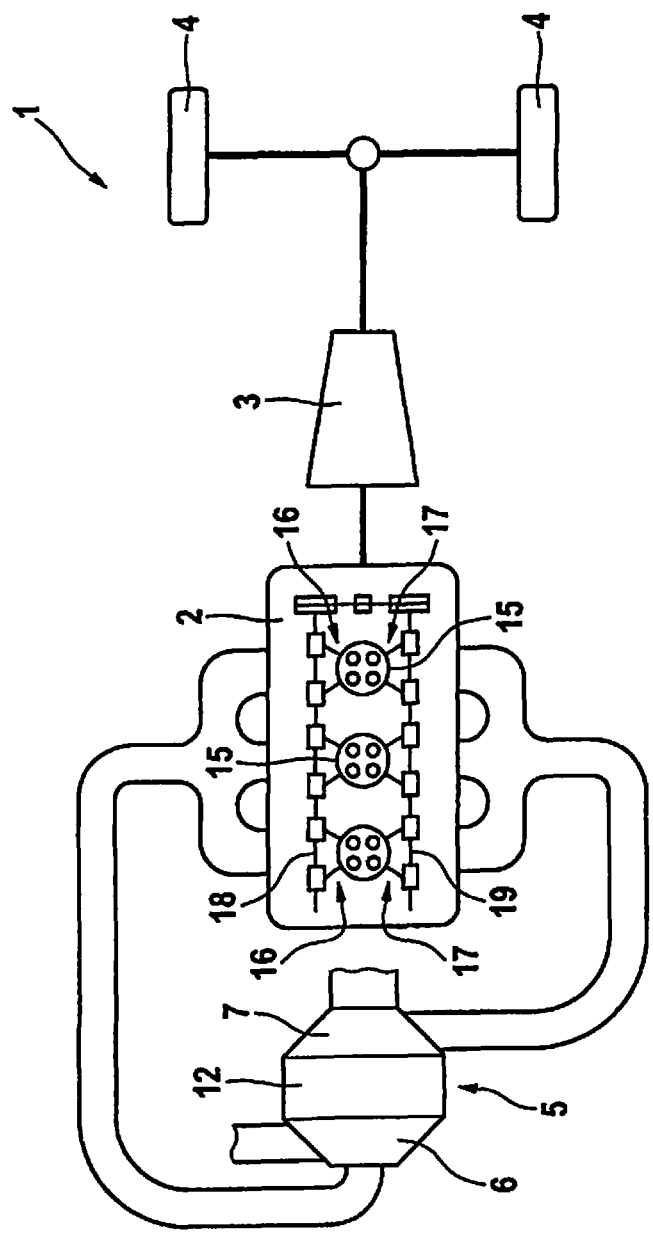
FIG. 1 is a simplified depiction of a drive apparatus of a motor vehicle.

FIG. 1 is a simplified depiction of a drive apparatus 1 of a motor vehicle that is not shown here in further detail. Drive apparatus 1 encompasses a reciprocating-piston engine constituting a drive mechanism, which is operatively connected via a transmission 3 to drive wheels 4. Associated with reciprocating-piston engine 2 is an exhaust-gas-driven turbocharger 5 that has a turbine 6 and a compressor 7 which are coupled to one another.

Figure 2:
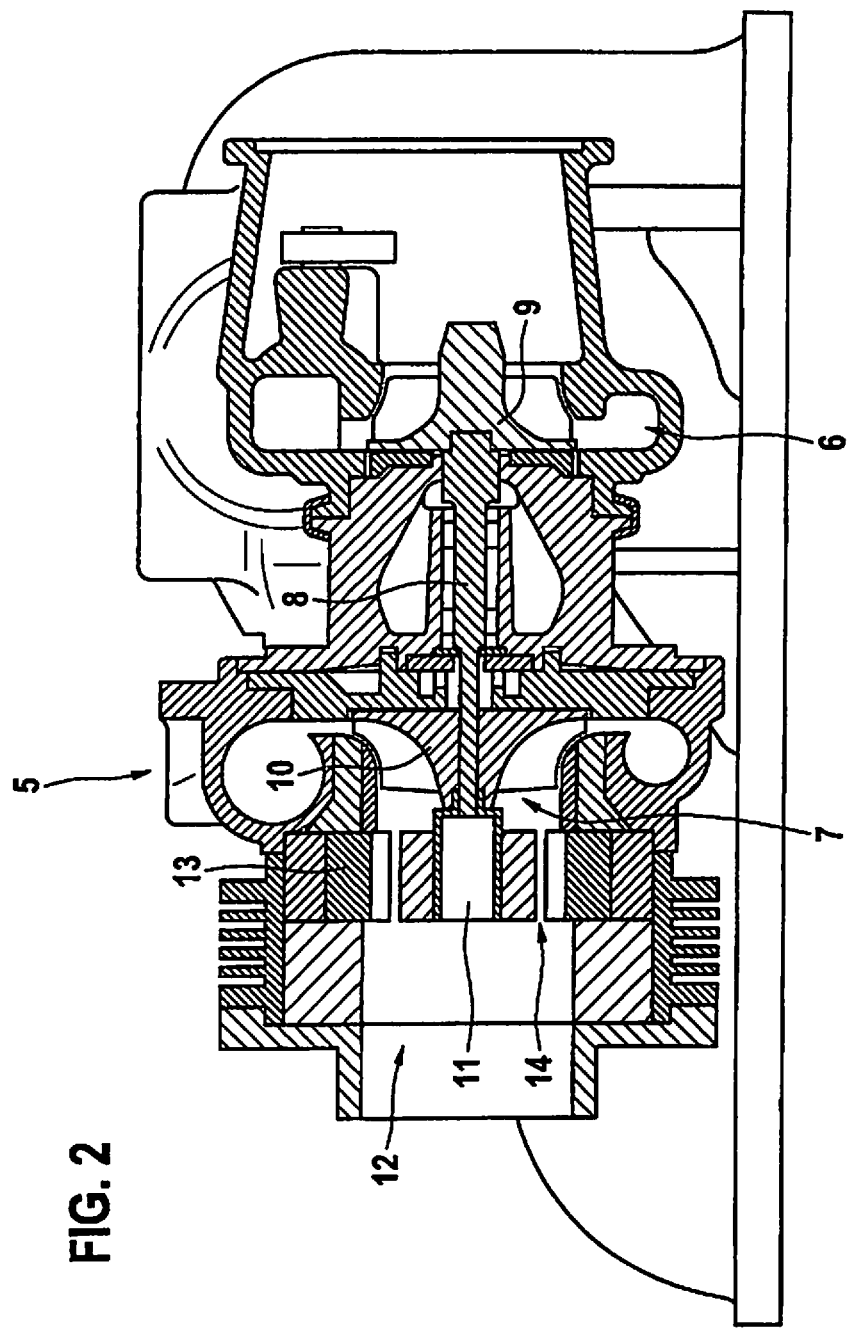
FIG. 2 is a simplified sectioned depiction of an exhaust-gas-driven turbocharger of the drive apparatus.

FIG. 2 is, for this purpose, an enlarged sectioned depiction of exhaust-gas-driven turbocharger 5. Compressor 6 has a compressor wheel 9 disposed nonrotatably on a shaft 8, a turbine wheel 10 of turbine 7 likewise being disposed nonrotatably on the same shaft 8. Also sitting nonrotatably on shaft 8 is a rotor 11 of an electrical machine 12 that is embodied as a media gap machine, which has a stator 13 disposed in housing-mounted fashion coaxially with rotor 11. Embodied in an air gap 14 between stator 13 and rotor 11 is a conduit for the medium to be delivered, in particular the exhaust gas of internal combustion engine 2, which flows to or is aspirated by compressor wheel 10 in order to be made available in compressed fashion to reciprocating-piston engine 2.

As shown in simplified fashion in FIG. 1, the reciprocating-piston engine has several cylinders 15 in which axially displaceable reciprocating pistons are disposed. Two intake valves 16 and two exhaust valves 17, which control gas exchange in the respective cylinder 15, are also associated with each cylinder 15. In order to actuate intake valves 16 and exhaust valves 17, the reciprocating-piston engine furthermore has two camshafts 18 and 19 that have, for each valve, at least one cam profile with which the valve is displaced in conventional fashion against the force of a spring element.

Figure 3:
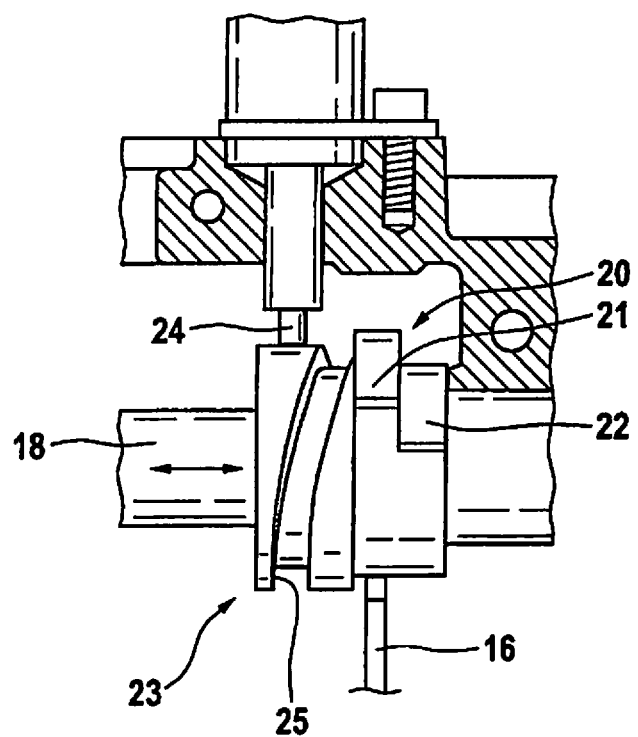
FIG. 3 is a simplified depiction of an adjusting device of the reciprocating-piston engine.

FIG. 3 is a simplified detail view of reciprocating-piston engine 2 with one intake valve 16 and camshaft 18. Camshaft 18 is embodied as an axially adjustable camshaft, which is therefore axially shiftable. The camshaft carries, for each intake valve 16, a respective cam 20, which is embodied as a double cam and encompasses for that purpose two differently embodied cam profiles 21 and 22 located next to one another. Also associated with cam 20 is a gated guide 23 which has a guidance pin 24, disposed on a housing side, which is radially displaceable in order to engage into a guidance groove 25 embodied in shaft 8. Guidance groove 25 is shaped in such a way that when guidance pin 24 is present in guidance groove 25 and camshaft 18 is rotating, camshaft 18 becomes axially shifted.

Gated guide 23 is embodied in such a way that depending on the shift of camshaft 18, cam profile 21 or cam profile 22 interacts with intake valve 16. Corresponding cam profiles are also provided for exhaust valves 17.

In contrast to conventional solutions, in the present case, provision is made that cam profile 21 is embodied for normal operation or on-load operation of reciprocating-piston engine 2, in which the latter generates a drive torque, while cam profile 22 is embodied for an advantageous overrun recovery mode of reciprocating-piston engine 2. For that purpose, provision is made in the present case that cam profile 21 is a four-stroke cam profile which ensures, during the operation of reciprocating-piston engine 2, actuation of intake valve 16 in accordance with a four-stroke operating mode; and that cam profile 22 is embodied as a two-stroke cam profile so that it opens the intake valve with each downward stroke of the piston. Usefully, a corresponding cam 20 is associated with each of valves 16, 17 of reciprocating-piston engine 2, the two camshafts 18 and 19 being correspondingly shiftable in order to switch between the four-stroke mode and two-stroke mode; the exhaust valves in two-stroke mode being opened with each upward stroke of the associated piston due to cams 20 associated with exhaust valves 17.

As described above, cam profile 22 serves for overrun operation. When reciprocating-piston engine 2 switches into overrun operation, cam profile 22 is therefore engaged so that reciprocating-piston engine 2 is switched into a two-stroke mode. This has the advantage that the gas flow throughput through reciprocating-piston engine 2 is doubled as compared with a four-stroke mode. The enthalpy and gas mass flow that turbine 6 can utilize are thus increased, so that the drive power output of exhaust-gas-driven turbocharger 5 during overrun operation of drive apparatus 1 is still sufficient to drive electrical machine 12 so that the latter can generate electrical energy in a generator mode.

The result of the example embodiment, and of the operation of drive apparatus 1, is therefore that it is possible to implement an advantageous recovery strategy with which, in normal operation or on-load operation of drive apparatus 1, reciprocating-piston engine 2 is operated in four-stroke mode and exhaust-gas-driven turbocharger 5 is assisted as applicable by machine 12 operated in motor mode, such that in overrun operation a switchover is made to a two-stroke mode of reciprocating-piston engine 2, and machine 12 is operated in generator mode. The result of the advantageously selected cam profiles 21 and 22 is that in overrun operation, the intake valve associated with each piston is opened with each downward stroke of that piston, and the exhaust valve associated with each piston is opened with each upward stroke of that piston, so that the mass throughput is doubled for the same intake manifold pressure.

If reciprocating-piston engine 2 is embodied as an Otto-cycle engine, in addition a throttle valve of reciprocating-piston engine 2 is preferably opened to maximum width. If exhaust-gas-driven turbocharger 5 has a variable turbine geometry that, in particular, encompasses adjustable guide vanes, then in overrun operation the latter are preferably moved to a minimum-flow position close to a stop. If exhaust-gas-driven turbocharger 5 has a wastegate device, then in overrun operation the wastegate is usefully closed so that the maximum possible mass flow is guided through the turbine.

Advantageously, in overrun operation the point in time at which the respective exhaust valve 17 opens is furthermore retarded or delayed by approximately 10° of spherical crankshaft angle, so that a compression event firstly occurs inside the cylinder before the respective exhaust valve opens. Additional enthalpy for driving turbine 7 is thereby furnished, in the form of a pulse charge, upon opening of the corresponding exhaust valve 17.

According to a further exemplifying embodiment that is not depicted here, it is also conceivable to dispose an electrical machine, rather than a media gap machine 12, on shaft 8 between turbine wheel 9 and compressor wheel 10. This too, because of the advantageous operation of reciprocating-piston engine 2, results in increased efficiency in terms of recovery of electrical energy.

What is claimed is:

1. A method for operating a drive apparatus of a motor vehicle, the drive apparatus having a reciprocating-piston engine and an exhaust-gas-driven turbocharger having an electrical machine, the method comprising:
    operating the reciprocating-piston engine in a four-stroke mode during on-load operation;
    operating the electrical machine of the exhaust-gas-driven turbocharger in generator mode during overrun operation of the reciprocating-piston engine; and
    operating the reciprocating-piston engine in a two-stroke mode during the overrun operation,
    wherein at least one camshaft of the reciprocating-piston engine is operated with a four-stroke cam profile during the on-load operation, and with a two-stroke cam profile during the overrun operation, wherein the at least one camshaft is embodied as an axially adjustable camshaft.

2. The method as recited in claim 1, wherein the electrical machine is a media gap machine.

3. The method as recited in claim 1, wherein at least one camshaft of the reciprocating-piston engine is operated with a four-stroke cam profile during the on-load operation, and with a two-stroke cam profile during the overrun operation.

4. The method as recited in claim 3, wherein the camshaft is shifted axially in order to modify a profile of the cam between the four-stroke cam profile and the two-stroke cam profile.

5. The method as recited in claim 4, wherein the camshaft is shifted by way of a gated guide.

6. The method as recited in claim 1, wherein during the overrun operation, a throttle valve of the reciprocating-piston engine is opened to maximum width.

7. The method as recited in claim 1, wherein during the overrun operation, at least one of: (i) a wastegate of the exhaust-gas-driven turbocharger is closed, and (ii) a variable turbine geometry of the exhaust-gas-driven turbocharger is adjusted to a minimum setting.

8. The method as recited in claim 1, wherein during the overrun operation, an opening point in time of at least one exhaust valve is retarded by the two-stroke cam profile.

* * * * *

UNITED STATES PATENT AND TRADEMARK OFFICE
CERTIFICATE OF CORRECTION

PATENT NO. : 10,711,661 B2
APPLICATION NO. : 15/574762
DATED : July 14, 2020
INVENTOR(S) : Michael Nau et al.

Page 1 of 1

It is certified that error appears in the above-identified patent and that said Letters Patent is hereby corrected as shown below:

On the Title Page

In Item (72) Inventors:
Please change the second inventor:
"Michael Bauerle"
To:
-- Michael Baeuerle --

Signed and Sealed this
Eighth Day of September, 2020

Andrei Iancu
*Director of the United States Patent and Trademark Office*